Sept. 5, 1967  L. A. CARMICHAEL, JR., ET AL  3,339,351
APPARATUS FOR REMOVING LIQUID PARTICLES IN A GAS STREAM
Filed March 12, 1965
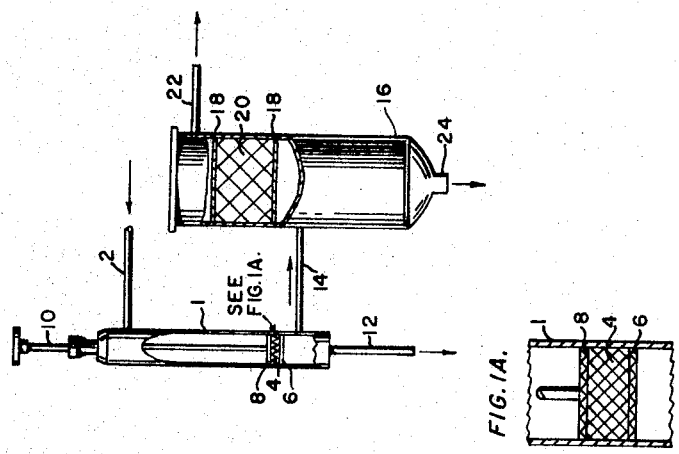
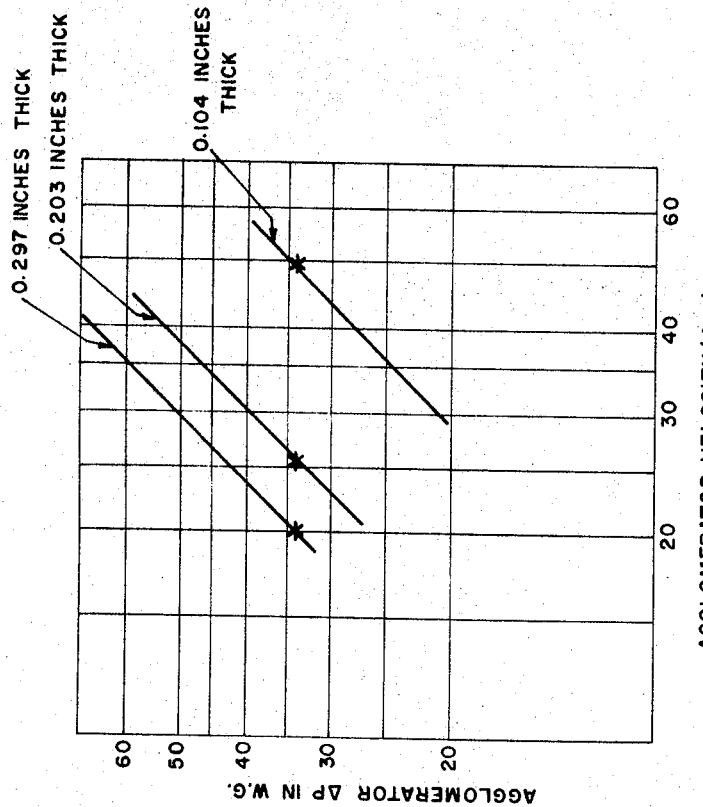
INVENTORS
LAURENCE A. CARMICHAEL JR.
ANDREW F. REESE

United States Patent Office 3,339,351
Patented Sept. 5, 1967

3,339,351
APPARATUS FOR REMOVING LIQUID
PARTICLES IN A GAS STREAM
Laurence A. Carmichael, Jr., San Jose, and Andrew F. Reese, Walnut Creek, Calif., assignors to Otto H. York Company, Inc., West Orange, N.J.
Filed Mar. 12, 1965, Ser. No. 439,328
4 Claims. (Cl. 55—350)

This invention relates to an apparatus for removing and collecting fine droplets of liquids which are contained and carried in a gaseous stream. More particularly, the invention relates to the removal of mist droplets of extremely small size, i.e. a diameter of from about 0.25–10 microns, from a gas stream at high efficiencies.

It is known that fine liquid droplets contained in a gas stream can be separated by passing the gas through an initial filter designed to agglomerate the liquid droplets into larger sized droplets and subsequently passing the gas stream containing these larger sized droplets into a second filter which separates the enlarged droplets from the gas stream. Such filters have been found perfectly satisfactory for separating the vast majority of liquid droplets contained in gas streams as efficiencies of up to about 98%. One such filter system is disclosed in U.S. Patent 2,521,785 issued to A. M. Goodloe on Sept. 12, 1950. However, where higher efficiencies at high flow rates are needed, the prior art systems have not been found effective in separating very fine liquid particles having diameters below 10 microns at efficiencies above 98%.

The requirement for high filter efficiencies, i.e. above 98%, has been brought about by the increased desire to avoid releasing very fine entrained liquid particles which are corrosive, toxic, or otherwise potentially harmful in the atmosphere. The nature of these materials requires reducing the amount released to the atmosphere by several orders of magnitude beyond that found acceptable with other, innocuous liquids. This problem is further aggravated because of the relatively large volumes of gas that must be treated from plant exit gas streams. For example, a typical commercial sulfuric acid plant generates 50,000 c.f.m. of exit gas that must be treated for removal of fine sulfuric acid droplets. In order to process such large volumes of gas in equipment of reasonable, commercial size, the gas must be passed through the treating unit at high velocities. Desirably, the treating unit should be capable of processing gas at velocities of from about 900 f.p.m. to about 3,000 f.p.m., or higher.

The necessity for removing fine liquid droplets at high separation efficiencies from relatively high velocity gas streams makes separation of the liquid droplets from the gas stream most difficult. As a result, there has developed a need for a scrubbing unit which can remove fine particles of liquid droplets on the order of 0.25–10 microns in a gas stream at very high efficiencies (i.e. over 98%) and with minimum resistance to gas flow.

It is an object of the present invention to provide an apparatus which will separate very fine liquid particles of from about 0.25–10 microns in diameter entrained in a high velocity gas stream at efficiencies of above 98% without an excess pressure drop across the separation means.

It is a further object to provide equipment for carrying out the above object.

These and other objects will be apparent from the following disclosure.

These objects can be achieved by passing a gas stream containing entrained fine liquid particles through a highly dense, relatively thin agglomerating filter, no thicker than about 0.5 inch, which is made up of a mat of very small diameter filaments (preferably below 0.01 inch) and contains no more than about 89% void, coalescing the liquid particles within the agglomeating filter, conveying the gas stream from said agglomerating filter together with entrained liquid particles having a larger average diameter than the initial liquid particles into a second separating means, separating the coalesced liquid particles of larger diameter from the gas stream, and thus removing more than 98% by weight of the liquid particles present in the original gas stream. The second separating means is preferably a filter made up of a mat of small diameter filaments and having a larger percent void (i.e. 97 to 99+% void) than that of the agglomerating filter.

This invention also provides for changing the density of the agglomerating filter in use as required to achieve proper coalescence of the fine liquid particles entrained in the gas stream.

The present invention is based on the discovery that higher efficiency of liquid removal can be obtained, without excessive pressure drops, by using as the agglomeration filter one having a greatly increased packing density, that is, containing no more than about 89 percent voids, and which is very thin (maximum thickness, about 0.5 inch). The highly dense but greatly thinner agglomerating filter surprisingly is able to coalesce the liquid droplets in the gas stream to a higher degree than a thicker, less dense filter without reaching excessive pressure drops across the filter. By contrast, the conventional approach of increasing the thickness of prior art agglomerators (which are more loosely packed than the instant agglomerating filter) to obtain better agglomeration does not increase the agglomerating efficiency of the filter to the present requirement of over 98%; it merely increases the pressure drop across the filter but never attains the desired efficiency.

In the operation of the present apparatus it has been found that the dense, agglomerator filter should not have a thickness greater than about 0.5 inch, the preferred thickness being from about 0.1 to about 0.5 inch. The use of agglomerator filters thicker than 0.5 inch has not been found to be any more effective in coalescing the liquid droplets; increasing the thickness merely increases the pressure drop across the filter. The pressure drop across the agglomerator filter will vary depending upon the velocity of the gas stream. However, at velocities of from about 15 to about 50 ft./sec., the present agglomerator will have a presure drop of from about 20 to about 50 inches water gauge with about 35 inches being normal to obtain over 98% by weight of liquid particle removal.

The entrained liquid particles in the gas stream are increased in size by the use of extremely fine filaments as packing in the make-up of the agglomerator filter. Packing filaments having diameters smaller than about 0.01 inch have been found most suitable for this purpose. If metal filaments are used as packing, the preferred diameter of the filaments is from about 0.002 to about 0.008 inch. Where plastic filaments are employed as packing in the agglomerator, e.g., "Teflon," filaments as fine as 0.0003 inch can be employed in the make-up of the filter. Normally, these filaments are grouped into bundles of larger diameter. In general, regardless of the filament material, the agglomerator is packed very densely so that the percent void (percent volume of filter not occupied by packing) is from about 50% to about 89%. When using stainless steel filaments as packing, the agglomerator should have a density of from about 60 to about 190 lbs./cu. ft. with about 144 lbs./cu. ft. being preferred.

When using the agglomerator with gas streams containing corrosive droplets, such as a mineral acid, e.g., phosphoric acid of sulfuric acid, it is preferred to pack the agglomerator with stainless steel wire because of the high resistance this metal has to the corrosive action of a mineral acid. In addition, certain nonmetallic fibers such as "Teflon" have been found suitable in the make-up of the agglomerator filter because of their resistance to attack by mineral acids. These can be used alone or in conjunction with the stainless steel wire, as desired.

In operation, the gas stream containing the entrained fine liquid particles first impinges on the densely packed agglomerator. The liquid particles strike the fine fibers of the agglomerator and coalesce into particles of larger size or droplets. These droplets then collect on the downstream side of the agglomerator filter and are pulled away from the agglomerator filter by the force of the flowing gas stream and re-entrained. These entrained, larger liquid particles are generally at least about 10 microns in size. Thus, the agglomerator changes the size of substantially all liquid particles to a size of at least 10 microns and preferably larger to facilitate their removal from the gas stream in a second separator downstream, as set forth hereafter.

In the present system, there is provided means for varying the density of the agglomerator filter as desired while in use in order to obtain maximum coalescence of the entrained liquid particles in the vapor stream. In addition, the adjusting means permits the packing density to be uniform throughout the filter, even though isolated portions of the filter may be removed, such as by corrosion or by erosion at a different rate than the remainder of the filter. In the absence of such means, channeling or other unencumbered paths through the filter might develop and prevent the high efficiency of the agglomerating filter.

After the gas stream has passed through the agglomerator and the gas stream contains only larger, coalesced liquid particles, it is fed into a separator. The separator removes the coalesced liquid particles of 10 microns diameter or more, from the gas stream. The separator can be any conventional impingement or centrifugal separator, e.g., cyclone separator, capable of removing and collecting the coalesced liquid particles from the gas stream.

The preferred separator for economic reasons is one that contains a second filter having a low packing density and a very high percent void. A void on the order of about 97% to about 99% is satisfactory in such filters. The packing density of these filters is usually below about 15 lbs./cu. ft. The material used in the filter can be any fine diameter filaments of either metal or plastic. The diameter of the packing filaments is not critical and packing material generally below about 0.015 inch has been found operative. A preferred filament size from the point of view of manufacture and cost is one having a diameter of about 0.006 inch.

These separator filters normally are from about 4 inches to about 6 inches thick, although larger or smaller thicknesses can be employed depending upon the pressure drop in the gas stream which can be tolerated. However, filters having pressure drops of no greater than about an inch water gauge have been found effective in removing the coalesced liquid droplets in the gas stream.

The efficiency of the separator filter depends upon the size of the coalesced particles which are given off by the agglomerator. Generally, where the smallest droplets in a gas stream are 10 microns or above, the separator filter is virtually 100% effective in removing these particles. However, if the size of these particles decreases to about 5 microns, the filter efficiency decreases to about 85%. Hence, in our preferred filter system, wherein over 98% of the liquid particles in a gas stream are removed, the agglomerator filter sufficiently increases the size of the coalesced liquid particles entrained in the gas stream to at least about 10 microns so that virtually complete particle removal is obtained in the second or separator filter.

It is preferred to maintain the separator filter in a horizontal position and to pass the gas stream containing the coalesced liquid particles upward through the filter. In this manner, liquid which collects in the separatory filter can run off and be carried by gravity downward to be collected at the base of the separator without the need for pumping means. The liquid which is collected at the base of the separator is then removed from the system. The gas stream that passes through the separator is removed from the top of the separator with over 98% by weight of the liquid particles removed and is vented to the atmosphere or conveyed elsewhere for further processing.

The invention will now be described with respect to the drawings. In the drawings:

FIG. 1 is a diagrammatic layout of one form of apparatus for carrying out the present process, while FIG. 1A is a plane view of an agglomerator element, and FIG. 2 is a graphic representation of the drop in pressure across a series of agglomerator filters of the type used herein at different gas velocities and at varying filter thicknesses. This figure is obtained from the data reported in Example 2.

As shown in FIG. 1 the gas stream containing the fine liquid particles passes into the agglomerator 1 of the present unit through conduit 2. Typical liquid particles in the feed stream range from about 0.25 micron up to about 10 microns. The liquid droplets can be any liquid which must be removed from the gas stream before being vented to the atmosphere or conveyed elsewhere for further processing. Typical entrained liquids include gas streams containing mineral acids, e.g. sulfuric acid or phosphoric acid, such as those obtained from stack gases in acid plants, alkaline mists, oil mists, or other non-volatile liquids which must be removed before venting.

The feed gas stream from conduit 2 enters the top of the agglomerator unit 1 in which is placed an agglomerator filter 4 supported between fixed supporting screens 6 and a movable support screen 8. A control rod 10 can be used to vary the density of the agglomerator filter 4 by pushing the control rod 10 against the upper, movable support screen 8 until the agglomerator filter is compressed to the desired density and thickness. As shown in FIG. 1A, the agglomerator filter is made up of a mat of thin fibers 4 contained between fixed support screen 6 and movable support screen 8 and is compressed to a dense mass by pushing rod 10 and attached screen 8 against the mat.

As the gas stream passes through the agglomerator filter 4, the liquid particles impinge on the thin filament packing of the filter and coalesce therein. The coalesced particles are removed from the downstream side of the filter partially as a separate liquid phase which collects at the base of the agglomerator 1 while the remainder is re-entrained in the gas stream. During the passage of the liquid particles through the agglomerator, the fine liquid particles are increased in size to at least about 10 microns and preferably higher. The liquid particles that collect at the base of the agglomerator are removed periodically through line 12. The gas stream containing the entrained, enlarged liquid particles then passes from the agglomerator to the separator through line 14.

The gas stream in line 14 enters the base of the separator 16 where it flows upward through the separator filter 20. The filter is supported between fixed wire mesh screen or grating 18 and is made up by packing fine filaments between the supporting wire mesh screen or grating 18. This filter has a much higher percent void than the agglomerator filter, preferably on the order of a least about 97%. The filter is preferably from about 4 inches to about 6 inches thick although thicker separator filters can be employed.

As the gas flows through the separator filter 20, the coalesced liquid particles entrained in the air stream are separated by the filter and collect at the base of the separator where they are periodically removed through line 24. The resulting gas stream which passes through the filter is free of the coalesced liquid particles and is removed from the top of the separator through line 22 and released to the atmosphere or conveyed to a further stage for additional processing.

In this embodiment the agglomerator and separator are shown as two separate units contained in separate vessels. However, it is considered within the scope of the present invention that they can be housed in a single unit, in which case the agglomerator filter 4 is positioned either in a horizontal or vertical position upstream from the separator filter.

In certain cases it is desirable to maintain the agglomerator filter in a wet condition by spraying water onto the packing. This improves efficiencies somewhat, particularly where the gas stream contains low amounts of liquid particles in the gas stream, by increasing the amount of liquid that is present on the agglomerator and thereby obtaining better coalescence of the entrained liquid particles when they strike the agglomerator. However, this is merely an optional step to further improve operating efficiencies, if desired.

The following examples are given to illustrate the present invention and are not deemed to be limiting thereof.

Example 1

A pilot scrubbing unit was made up similar to that illustrated in FIG. 1 containing a 2 inch diameter agglomerator and a 6 inch diameter separator. A series of agglomerator filters varying in thickness was made up of 4 mil. stainless steel wire. The filters were made by compressing the stainless steel wire mesh to a packing density of about 144 lbs./cu. ft. The agglomerator filters had thicknesses as set forth in Table I. The separator filter was 6 inches thick and was made up of stainless steel wire 6 mils. in diameter. It had a density of about 14 lbs./cu. ft. and a percent void of about 97%. A gas stream containing 65 grains/s.d.c.f. of phosphoric acid particles (100% basis) below about 5 microns was passed through the unit in contact with the agglomerator filter at the flow rate specified in Table I. Samples of the gas stream leaving the unit were analyzed for phosphoric acid and the percent efficiency of the unit was calculated. These results are reported below.

Example 2

The following runs were made in the same equipment used in Example 1 with a series of agglomerator filters made from 4 mil stainless steel wire. Agglomerator filters of different thicknesses but of substantially similar bed densities were used in order to ascertain the agglomeration efficiencies of these filters. The following runs were made by adjusting the velocity of the gas stream so that the unit operated at 99.86% efficiency. Then the velocity of the gas stream contacting the agglomerator and the drop in pressure across the agglomerator were recorded. The data from three of the runs which were made is set forth in Table II. The remainder of the data is plotted in FIG. 2, in which the abscissa axis defines the gas velocity striking the agglomerator in feet per second, while the ordinate axis defines the pressure drop ($\Delta P$) across the agglomerator in terms of inches of water.

TABLE II

| Run | Agglomerator | | | | Velocity of Gas Stream (f.p.s.) | Pressure Drop for Operating Efficiency of 99.86% |
|---|---|---|---|---|---|---|
| | Bed Thickness (in.) | Bed Weight (g.) | Bed Density (lbs./cu. ft.) | Percent Void | | |
| 1 | 0.297 | 31.08 | 144 | 71.2 | 19.5 | 34 |
| 2 | 0.203 | 20.97 | 142 | 71.6 | 25.5 | 34 |
| 3 | 0.104 | 10.78 | 144 | 71.2 | 46 | 34 |

As will be seen from Table II and from the results shown in FIG. 2, the thicker agglomerator filters of equal density reach the desired agglomeration efficiencies at the same $\Delta P$ as the thinner filters, but result in a much lower gas stream velocity. Thus, increasing the thickness of the agglomeration filter does not result in more efficient agglomeration of liquid particles; it merely reduces the gas flow rates of the gas stream through the unit. This example illustrates the importance of using as thin an agglomerator filter as possible to obtain more efficient coalescence of the fine liquid particles without a corresponding increase in pressure drop across the filter.

Example 3

The following runs were carried out using the same equipment as in Example 1 to filter a gas stream containing phosphoric acid droplets substantially all below 5 microns in size. The properties of the agglomerator filter, flow rates, and pressure drops across the filters are set forth in Table III. The packing used in the formation of the agglomerator filter was stainless steel wire having a diameter of 35 microns. Run 6 was carried out using a water spray above the agglomerator filter. The inlet gas stream and the exit gas stream were measured for phosphoric acid content and the percent efficiency of the entire scrubber unit was calculated and is reported in Table III.

TABLE I

| Run | Input Gas Velocity (f.p.s.) | Pressure Drop (Inches Water Gauge) | | Agglomerator | | | | Percent Efficiency of Scrubber |
|---|---|---|---|---|---|---|---|---|
| | | Agglomerator Filter | Separator Filter | Bed Thickness (in.) | Bed Weight (g.) | Bed Density (lbs./cu. ft.) | Percent Void | |
| 1 | 38.9 | 51.0 | 0.2 | 0.203 | 20.9 | 142 | 71.6 | 99.95 |
| 2 | 38.8 | 51.3 | 0.2 | 0.203 | 20.9 | 142 | 71.6 | 99.96 |
| 3 | 23.7 | 31.0 | 0.05 | 0.203 | 20.9 | 142 | 71.6 | 99.85 |
| 4 | 30.1 | 39.2 | 0.05 | 0.203 | 20.9 | 142 | 71.6 | 99.90 |
| 5 | 25.7 | 43.4 | 0.05 | 0.297 | 31.08 | 144 | 71.2 | 99.92 |
| 6 | 25.3 | 42.5 | 0.05 | 0.297 | 31.08 | 144 | 71.2 | 99.93 |

TABLE III

| Run | Input Gas Stream | | Agglomerator | | | | Pressure Drop (ΔP) (Inches Water Gauge) | | Percent Efficiency of Scrubber |
|---|---|---|---|---|---|---|---|---|---|
| | Velocity (f.p.s.) | Amount (grains/s.d.c.f.) of $H_3PO_4$ (100% basis) | Bed Thickness (in.) | Bed Weight (g.) | Bed Density (lbs./cu. ft.) | Percent Void | Agglomerator Filter | Separator Filter | |
| 1 | 43.0 | 54 | 3/16 | 7.75 | 57 | 88.7 | 43.4 | 0.2 | 99.84 |
| 2 | 43.3 | 65 | 3/16 | 7.75 | 57 | 88.7 | 40.7 | 0.2 | 99.88 |
| 3 | 32.0 | 65 | 1/8 | 7.75 | 85 | 83.0 | 45.3 | 0.1 | 99.97 |
| 4 | 33.2 | 65 | 1/8 | 7.57 | 85 | 83.0 | 46.9 | 0.1 | 99.98 |
| 5 | 24.8 | 62.5 | 1/8 | 7.75 | 85 | 83.0 | 36.2 | 0.05 | 99.96 |
| 6 | 21.8 | 65 | 1/8 | 7.75 | 85 | 83.0 | 37.7 | 0.15 | 99.98 |

*Example 4*

The following runs were made in the same equipment specified in Example 1 to filter a gas stream containing 65 grains/s.d.c.f. (100% basis) of $H_3PO_4$ droplets having a size of 5 microns or below. The properties of the agglomerator filter, flow rates, and pressure drops across the filters are set forth in Table IV. The packing used in the formation of the agglomerator filter was stainless steel wire having the diameter specified in Table IV. The exit gas streams were measured for phosphoric acid content and the percent efficiency of the scrubbing unit was calculated and is reported below.

TABLE IV

| Run | Velocity of Gas Stream Contracting Agglomerator Filter (f.p.s.) | Agglomerator Filter | | | | | Pressure Drop (ΔP) (Inches Water Gauge) | | Percent Efficiency of Scrubber |
|---|---|---|---|---|---|---|---|---|---|
| | | Bed Thickness (in.) | Wire Diameter (mils) | Bed Density (lbs./cu. ft.) | Bed Weight (g.) | Percent Void | Agglomerator Filter | Separator Filter | |
| 1 | 36.9 | 7/16 | 3.5 | 99 | 31.4 | 80.2 | 43.1 | 0.15 | 99.91 |
| 2 | 37.7 | 7/16 | 3.5 | 99 | 31.4 | 80.2 | 45.9 | 0.15 | 99.91 |
| 3 | 18.8 | 1/4 | 3.5 | 170 | 30.8 | 66.1 | 34.0 | 0.0 | 99.89 |
| 4 | 18.0 | 1/4 | 3.5 | 170 | 30.8 | 66.1 | 34.8 | 0.0 | 99.89 |
| 5 | 24.0 | 1/4 | 3.5 | 170 | 30.8 | 66.1 | 48.2 | 0.1 | 99.96 |
| 6 | 25.6 | 1/4 | 4.5 | 158 | 28.7 | 68.5 | 34.2 | 0.1 | 99.87 |

*Example 5*

A gas stream containing 65 grains/s.d.c.f. (100% basis) of $H_3PO_4$ droplets having a size of 5 microns or below, was passed through an agglomerating filter under identical conditions to that described in Example 4, Run 1, except that the agglomerating filter was maintained wet by injecting a water spray into the upper surface of the agglomerator. The gas stream, after flowing through the agglomerator, was conveyed to a cyclone separator for removal of the entrained, coalesced liquid particles. The gas stream from the cyclone separator was analyzed for phosphoric acid, and the efficiency of the scrubber unit was found to be over 99.9%.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Apparatus especially useful for removing liquid particles of a mineral acid having a size of from about 0.25 to about 10 microns which are entrained in a flowing gas stream which comprises confining means comprising a pair of laterally spaced housing means defining a gas flow passage, the first of said housing means having a gas inlet at one end and a gas outlet and liquid outlet at the other end, an agglomeration filter positioned within and across said first housing means intermediate said inlet and outlets, said agglomeration filter being from 0.1 to 0.5 inch thick and made up of a mat of filaments having a diameter of from about .0003 to about 0.15 inch, said agglomeration filter having from 50 to 89% void, the second housing means having a gas inlet and a liquid outlet adjacent one end and a gas outlet adjacent the other end, a second filter positioned within and across said second housing means intermediate said gas outlet and said gas inlet and liquid outlet, the gas inlet to the second housing means being connected to the gas outlet of said first housing means, said second filter being made up of a mat of filaments wherein the percent void of said second filter is 97 to 99%, and 4 to 6 inches thick.

2. Apparatus of claim 1 wherein said agglomeration filter is made up of stainless steel filaments having a diameter of from about 0.015 to 0.002.

3. Apparatus of claim 1 wherein said agglomeration filter is made up of Teflon filaments.

4. Apparatus of claim 1 including compression means within said first housing means for altering the packing density of said agglomeration filter.

References Cited

UNITED STATES PATENTS

| | | | |
|---|---|---|---|
| 1,140,198 | 5/1915 | Smith | 55—97 |
| 1,379,056 | 5/1921 | Smith. | |
| 1,659,146 | 2/1928 | Klugh | 55—97 |
| 2,521,785 | 9/1950 | Goodloe. | |
| 2,848,060 | 8/1958 | McBride et al. | |
| 2,881,116 | 4/1959 | Siegfried | 55—97 |
| 2,894,050 | 7/1959 | Stiles | 55—525 |
| 3,026,966 | 3/1962 | Asklof | 55—277 |
| 3,066,462 | 12/1962 | Yap et al. | 55—97 |
| 3,107,986 | 10/1963 | Plaut et al. | 55—97 |
| 3,135,592 | 6/1964 | Fairs et al. | 55—524 |
| 3,197,946 | 8/1965 | Taylor | 55—97 |
| 3,237,812 | 3/1966 | Kemp | 55—526 |
| 3,250,059 | 5/1966 | Vosseller | 55—96 |

HARRY B. THORNTON, *Primary Examiner.*

B. NOZICK, *Assistant Examiner.*

UNITED STATES PATENT OFFICE
CERTIFICATE OF CORRECTION

Patent No. 3,339,351                      September 5, 1967

Laurence A. Carmichael, Jr., et al.

It is hereby certified that error appears in the above numbered patent requiring correction and that the said Letters Patent should read as corrected below.

Column 1, line 24, for "as" read -- at --; columns 7 and 8 TABLE III, fifth column, line 4 thereof, for "7.57" read -- 7 --; same columns, TABLE IV, in the heading to the second colur line 3 thereof, for "Contracting" read -- Contacting --; colur 8, line 20, for "0.15" read -- .015 --.

Signed and sealed this 24th day of September 1968.

(SEAL)
Attest:

Edward M. Fletcher, Jr.                      EDWARD J. BRENNI

Attesting Officer                          Commissioner of Patent